Patented Jan. 9, 1934

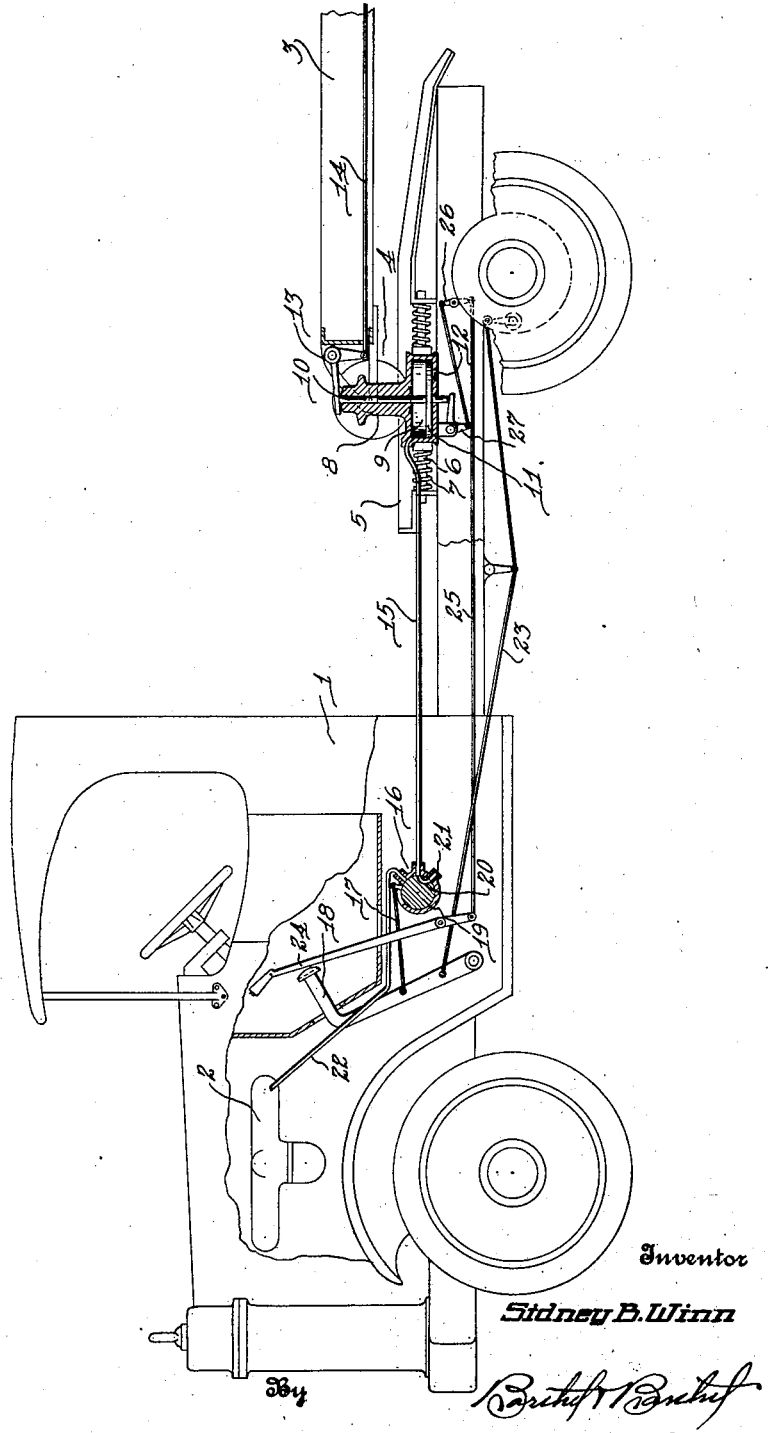

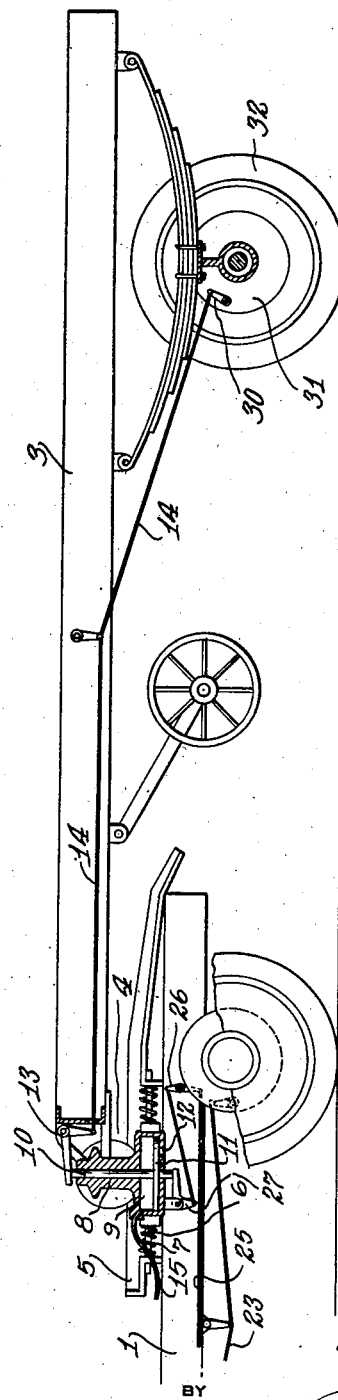

1,942,628

UNITED STATES PATENT OFFICE 1,942,628

TRACTOR BRAKE SYSTEM

Sidney B. Winn, Lapeer, Mich.

Application May 29, 1930. Serial No. 456,949

10 Claims. (Cl. 188—3)

The present invention pertains to a novel pneumatic braking mechanism which is particularly adapted to tractor-trailer constructions and comprises an auxiliary braking means mounted upon the tractor and devised to automatically apply the brakes on the trailer when the tractor foot brake, constructed and operated in the usual or conventional manner, is applied.

A primary object of the present invention is to employ suction, which may be obtained by tapping into the intake manifold of the tractor motor, to apply or set the brakes mounted on the trailer, the suction being controlled by mechanism which is entirely mounted upon the tractor and devised to operate the trailer brakes through the king pin which provides the coupling means between the tractor and the trailer. In the present manner of construction it becomes possible to eliminate the pipe line connections commonly found in the hydraulic brake constructions which are adaptable to tractors and trailers, this feature being one of paramount importance inasmuch as the safety and dependability of the brakes reaches a much higher degree by avoiding the necessity of having to make or break the pipe line connections between the tractor and the trailer.

In conventional hydraulic brakes for tractors and trailers, it has heretofore been necessary to provide a hose line connecting the brakes on the trailer to the pressure source on the tractor. This construction necessitates an air hose between the tractor and the trailer and the objections to the hose are many. The hose is expensive, and reliance cannot be placed upon it owing to the fact that it is not fool proof, it permitting the operator of the tractor to forget to uncouple the hose connection when uncoupling from the trailer and thereby break or destroy the hose. Again it is unsafe for the operator may forget to connect the hose connections when he couples the tractor to the trailer and he may drive away without any braking connection between the foot pedal in the tractor cabin and the brakes on the trailer wheels.

With the above and other ends in view, the present invention consists in the matters hereinafter set forth and more particularly pointed out in the appended claims, reference being had to the accompanying drawings in which Fig. 1 is a side elevation of the tractor and a fragment of a trailer connected thereto, both the tractor and trailer being partly broken away and in cross section, and Fig. 2 is a side elevation of the trailer and a fragment of the tractor, both the trailer and the tractor being partly broken away and in cross section.

Like characters are employed throughout to designate the corresponding parts.

The numeral 1 designates a tractor which may be of any suitable type driven by an internal combustion engine having an intake manifold 2 which is utilized by the present device as a source of partial vacuum. A trailer 3 is provided and is equipped with coupling mechanism 4 adapted to co-operate with the fifth wheel construction 5 mounted upon the trailer for the purpose of connecting the tractor to the trailer. The construction illustrated is merely by way of example, it being possible to use any suitable mechanism in conjunction with the parts hereafter to be described which go to form the present invention.

Draw bars 6 having springs 7 are provided on the fifth wheel to support a king pin 8 which is formed with an enlarged hollow cylinder 9 at its lower end. A circular bore is provided in the center of the king pin to accommodate a brake push pin 10 having a head in the nature of a piston 11 near its lower end which is received in the cylinder 9, a plurality of vents 12 being provided in the lower wall of the cylinder beneath the piston. A bell-crank lever 13 is mounted on the trailer so that one of its arms rests upon the top of the push pin 10, the other arm being connected by the brake rod 14 to the operating levers 30 on the brakes 31 on the trailer wheels 32.

A pipe line 15 is connected into the cylinder 9 above the piston 11 and is connected into a two way valve 16 operated by a rod 17 connected to the brake pedal 18. The valve is provided with a rotatable member 19 having a passage 20 which is adapted to register with the pipe line 15 and an opening 21 which connects the cylinder 9 to the atmosphere, or it is adapted to register with the pipe line 15 and with a pipe line 22 which is connected into the intake manifold 2 of the tractor motor.

The above described mechanism constitutes a suction operated pneumatic means for applying the trailer brakes and is devised so that it will not interfere with the usual brakes on the tractor and is constructed to operate in conjunction therewith. The foot pedal 18 which operates the valve 16 is connected in the usual manner by a brake rod 23 to the brakes on the rear wheels of the tractor, this construction permitting the brakes on the tractor and trailer to be applied simultaneously or one before the other, whichever is found desirable being obtained by changing the length of the rod 17.

The required emergency or parking brake is also accommodated by the present construction and comprises a lever 24 connected by the rod 25 to a lever 26 which is in turn connected to a bell crank lever 27 of which one arm rests on the lower end of the push pin 10 for raising or lowering the same, it being apparent from the above description that raising the push pin 10 applies the brakes 31 on the trailer.

By depressing the brake pedal 18, communication is made between the intake manifold 2 and the cylinder 9 above the piston 11 and a partial vacuum is created therein. The piston 11 moves upwardly as a result of atmospheric pressure entering the vents 12 and acting upon the lower face of the piston 11 and the push pin 10 is moved upwardly to rock the bell crank 13 to set the brakes on the trailer wheels. When the brake pedal is allowed to raise to its normal position, the valve 16 permits the vacuum to be broken by admitting atmosphere through the port 21 into the cylinder 9 and the pressure on the brakes is relieved.

Although a specific embodiment of the present invention has been illustrated and described, it is to be understood that various changes may be made within the scope of the appended claims without departing from the spirit of the invention, and such changes are contemplated.

What I claim is:—

1. The combination with a tractor having a king pin and a trailer having brakes adapted to be applied by means of a push pin supported in said king pin, of pneumatic means for operating said push pin to actuate said brakes, said means including a cylinder formed integral with said king pin, and a piston within said cylinder attached to said push pin.

2. The combination with a tractor provided with a king pin having a cylinder formed on its lower end and a trailer having brakes adapted to be applied by a push pin received in said king pin, of a piston formed on said push pin and received in said cylinder, and a source of suction connected to said cylinder and adapted to effect movement of said piston to apply said brakes.

3. The combination with a tractor provided with a king pin having a cylinder formed on its lower end and a trailer adapted to be connected to said tractor by means of said king pin, of a push pin slidably mounted in said king pin, a piston mounted on said push pin and received in said cylinder, and a source of suction connected to said cylinder and adapted to effect movement of said piston for actuating said push pin in a manner to actuate brakes mounted on said trailer.

4. The combination with a tractor having a brake actuating mechanism and a king pin and a trailer having brakes adapted to be applied by means of a push pin supported in said king pin, of pneumatic means for operating said push pin to actuate said brakes, said pneumatic means including a cylinder formed on said king pin, and a piston slidable within said piston and connected to said push pin, a valve mechanism controlled by the tractor brake actuating mechanism and a source of suction controlled by said valve mechanism and adapted to operate said pneumatic means.

5. The combination with a tractor provided with a king pin having a cylinder formed on its lower end and a trailer having brakes adapted to be applied by a push pin received in said king pin, of a piston formed on said push pin and received in said cylinder, a source of suction connected to said cylinder and adapted to effect movement of said piston in a manner to apply said brakes and a valve mechanism for controlling said suction.

6. The combination with a brake actuating mechanism and a tractor provided with a king pin having a cylinder formed on its lower end and a trailer adapted to be connected to said tractor by means of said king pin, of a push pin slidably mounted in said king pin, a piston mounted on said push pin and received in said cylinder, a source of suction connected to said cylinder and adapted to effect movement of said piston for actuating said push pin in a manner to actuate brakes mounted on said trailer, and a valve mechanism controlled by the tractor brake actuating mechanism for controlling communication of said cylinder with said source of suction.

7. The combination with a tractor, of a king pin mounted on said tractor and having an enlarged cylinder formed on the lower end thereof, a trailer adapted to be coupled to said tractor by means of said king pin, a push pin mounted in said king pin and adapted to operate brakes mounted on said trailer, a piston on said push pin and adapted to be received in said piston, means for creating a partial vacuum on one side of said piston, and means for admitting atmospheric pressure on the opposite side of said piston whereby atmospheric pressure may be utilized to actuate the piston and push pin for applying the brakes on said trailer.

8. The combination with a tractor having brakes adapted to be operated by a foot pedal, of a king pin mounted on said tractor and having an enlarged cylinder formed on the lower end thereof, a trailer adapted to be coupled to said tractor by means of said king pin, a push pin mounted in said king pin and adapted to operate brakes mounted on said trailer, a piston on said push pin and adapted to be received in said piston, means for creating suction, a valve mechanism operated by said foot brake pedal for controlling said suction and utilizing it to create a partial vacuum on the upper side of said piston, and means for permitting atmospheric pressure to operate on the lower side of said piston for moving said piston and push pin upwardly to apply the brakes on said trailer.

9. The combination with a tractor, provided with a king pin having a cylinder formed on its lower end, and a trailer having brakes adapted to be applied by a push pin received in said king pin, of a piston formed on said push pin and received in said cylinder, a source of suction connected to said cylinder and adapted to effect movement of said piston to apply said brakes, and a valve mechanism for introducing atmospheric pressure into said cylinder when said brakes are released.

10. The combination with a tractor, provided with a brake actuating mechanism and a king pin having a cylinder formed on its lower end, and a trailer adapted to be connected to said tractor by means of said king pin, of a push pin slidably mounted in said king pin, a piston on said push pin and received in said cylinder, a source of suction connected to said cylinder and adapted to effect movement of said piston for actuating said push pin in a manner to actuate brakes mounted on said trailer, and a valve mechanism controlled by the tractor brake actuating mechanism for preventing communication between said source of suction and said cylinder and for simultaneously opening said cylinder to the atmosphere.

SIDNEY B. WINN.